US012168249B1

(12) United States Patent
Robinson

(10) Patent No.: US 12,168,249 B1
(45) Date of Patent: Dec. 17, 2024

(54) PLUMBING SUPPLY TRANSPORT CASE AND METHOD OF SANITIZING AND TRANSPORTING PLUMBING SUPPLIES

(71) Applicant: Jackie Robinson, Detroit, MI (US)

(72) Inventor: Jackie Robinson, Detroit, MI (US)

( * ) Notice: Subject to any disclaimer, the term of this patent is extended or adjusted under 35 U.S.C. 154(b) by 217 days.

(21) Appl. No.: 16/719,923

(22) Filed: Dec. 18, 2019

Related U.S. Application Data

(63) Continuation-in-part of application No. 15/584,421, filed on May 2, 2017, now Pat. No. 10,604,320.

(60) Provisional application No. 62/917,595, filed on Dec. 18, 2018, provisional application No. 62/496,474, filed on Oct. 19, 2016, provisional application No. 62/391,508, filed on May 2, 2016.

(51) Int. Cl.

| | |
|---|---|
| ***B65D 51/24*** | (2006.01) |
| ***B08B 3/04*** | (2006.01) |
| ***B08B 3/08*** | (2006.01) |
| ***B08B 3/10*** | (2006.01) |
| ***B08B 13/00*** | (2006.01) |
| ***B08B 15/04*** | (2006.01) |
| ***B65D 25/10*** | (2006.01) |
| *E03C 1/302* | (2006.01) |

(52) U.S. Cl.
CPC ................ *B08B 3/044* (2013.01); *B08B 3/08* (2013.01); *B08B 3/102* (2013.01); *B08B 13/00* (2013.01); *B08B 15/04* (2013.01); *B65D 25/10* (2013.01); *B65D 51/24* (2013.01); *E03C 1/302* (2013.01)

(58) Field of Classification Search
CPC ..... B65F 1/14; A46B 17/06065; A46B 17/06; A46B 17/065; A46B 2200/304; A47K 17/00; E03D 9/00
See application file for complete search history.

(56) References Cited

U.S. PATENT DOCUMENTS

| | | | | |
|---|---|---|---|---|
| 337,888 | A | 3/1886 | Swan | |
| 1,927,110 | A | 9/1933 | Bannister et al. | |
| 2,569,021 | A | 9/1951 | Rozanski | |
| 2,650,449 | A | 9/1953 | Suring | |
| 2,825,445 | A | 3/1958 | Golden | |
| 2,844,244 | A | 7/1958 | Hanson | |
| 3,367,483 | A | 2/1968 | Studen | |
| 3,583,556 | A | 6/1971 | Wagner | |
| 6,383,457 | B1 * | 5/2002 | Brown | A61L 2/26 206/349 |
| 6,813,785 | B1 * | 11/2004 | Baker | E03D 9/00 4/255.05 |
| 7,841,029 | B1 * | 11/2010 | Williams | A47K 17/00 4/661 |
| 9,441,353 | B1 * | 9/2016 | Hamil | E03D 11/00 |
| 9,848,743 | B1 * | 12/2017 | Shabat | B65D 43/02 |
| 2007/0081850 | A1 * | 4/2007 | DeRoma | A47K 11/10 401/278 |
| 2008/0022712 | A1 * | 1/2008 | Carr | F24F 5/0017 62/425 |

(Continued)

*Primary Examiner* — Ernesto A Grano
*Assistant Examiner* — Symren K Sanghera
(74) *Attorney, Agent, or Firm* — University of Detroit Mercy School of Law International IP Clinic

(57) ABSTRACT

A device for transporting a plunger that includes an outer housing defining an interior chamber a lid, the lid configured to releasably and sealingly engage the first end of the cylindrical wall member, the lid including a planar surface and a fan member operatively mounted in the lid.

15 Claims, 16 Drawing Sheets

(56) References Cited

U.S. PATENT DOCUMENTS

| | | | | |
|---|---|---|---|---|
| 2010/0019183 | A1* | 1/2010 | Bosma | B60H 1/3421<br>251/248 |
| 2011/0253180 | A1* | 10/2011 | Davidson | A47K 17/00<br>134/135 |
| 2012/0012136 | A1 | 1/2012 | Nguyen | |
| 2016/0107796 | A1* | 4/2016 | Sibley | B65D 85/70<br>206/459.5 |
| 2020/0079585 | A1* | 3/2020 | Everard | B65F 1/1405 |
| 2020/0291962 | A1* | 9/2020 | Tsorng | F04D 29/604 |
| 2020/0353111 | A1* | 11/2020 | Schmiddem | A46B 17/065 |
| 2021/0251161 | A1* | 8/2021 | Croteau | A01G 9/18 |
| 2022/0087474 | A1* | 3/2022 | Carter | A47J 37/0754 |

* cited by examiner

PLUMBING SUPPLY TRANSPORT CASE AND METHOD OF SANITIZING AND TRANSPORTING PLUMBING SUPPLIES

CROSS-REFERENCE TO RELATED APPLICATIONS

This application is a continuation in part of U.S. patent application Ser. No. 15/584,421 filed May 2, 2017, which claims priority to U.S. Provisional Application No. 62/496,474 filed Oct. 19, 2016, and is a U.S. Provisional Application No. 62/391,506 filed May 2, 2016. This application also claims priority to U.S. Provisional Application No. 62/917,595 filed Dec. 18, 2018. The specifications of all applications are incorporated by references herein in their entireties.

BACKGROUND

This disclosure relates to devices for transporting and storing plumbing devices that are configured to come into contact with human waste such as urine and/or fecal matter. The disclosure also pertains to a method for cleaning and sanitizing one or more plumbing devices that have come into contact with human waste such as urine and/or fecal matter.

Various devices are used in plumbing repair and maintenance. Among these devices are toilet augers. Such devices are also variously known as plumber's augers, toilet snakes and the like and can be used to loosen clogs that develop in toilets. Generally, such devices can include a coiled metal wire that can be configured with a broader gap between the coils at the terminal end. The coiled metal wire can be operatively connected to a crank mechanism. In hand-operated devices, an operator turns the handle of the crank mechanism to rotate the helix as it moves through the pipe. Toilet augers, also called closet augers, can feed a relatively short auger through a hook-shaped length of metal tubing. A hook shape can make it easier to feed the auger into the toilet. A plastic boot on the end of the auger can protect the finish of the visible porcelain. Since most toilet clogs occur in the trap built into the bowl, the short cable is sufficient to break up or retrieve the greater majority of clogs.

Once the device is used, the coiled metal wire can be wet and contaminated with fecal matter and body waste. Removal can pose localized contamination issues and further transport of the auger can be a messy business. Thus, it is desirable to provide a device that can house the auger in a suitable manner for transport and future use.

Other devices that are employed in plumbing repair and maintenance include plungers. Plungers are sometimes called force cups, plumber's friend or plumber's helper. Plungers can be employed to clear blockages in drains and pipes and can typically include a deformable polymeric suction cup member that is attached to a shaft. The shaft can be made of a rubber material where desired or required. The shaft can be made of a generally rigid material such as wood or plastic. In common use, the suction cup portion of the plunger is pushed down against the drain opening by pressing hard into the drain to force air into the drain or pushing down until the rubber cup is flattened and then pulling the plunger out creating a vacuum that dislodges and attracts material in order to loosen or break up a blockage caused by excessive material in the drain. In toilet blockage situations, the suction cup is immersed in the toilet bowl to contact the toilet drain. This operation can cause the plunger to come into contact with urine and fecal matter present in the toilet bowl or drain blockage. Removal of the plunger can pose localized contamination issues and further transport of the plunger can be a messy and possibly indiscrete business. Thus, it is desirable to the provide a device that can house the auger in a suitable manner for transport and future use.

Removal of a contaminated auger and/or plunger also presents complicated cleaning issues.]In many situations, the contaminated device such as the auger or plunger must be moved through associated restroom where it can drip on the associated bathroom surfaces and the device may or may not be able to be cleaned.

It would be desirable to provide a method for cleaning and/or sanitizing the auger and/or plunger device in a self-contained and effective manner.

SUMMARY

In certain embodiments, there is presented a device for transporting a plumbing tool that includes an outer housing defining an interior cavity, the outer housing having at least one rigid panel member having an outer periphery, the rigid panel forming a support base, the outer housing having at least one reclosable drain hole and at least one reclosable access aperture defined therein. Also disclosed is a member moveably mounted on the outer housing, the member movable between a first position in which the at least one reclosable access aperture is open and a second position in which the movable member is in watertight sealed relationship with the outer housing; and at least one first anchor clamp connected to the rigid panel member of the outer housing and projecting into the interior of the interior cavity defined in therein, the at least one first anchor clamp configured to releasably engage a toilet auger and maintain the toilet auger in fixed relationship relative to the at least one rigid panel. The device can be configured to transport one or more augers and, where desired or required, can be configured to transport a plunger in addition to the at least one auger and, where desired or required, the device(s) can be cleaned by a method such as that disclosed herein.

In certain embodiments, there is disclosed a device that is configured to transport and releasably house a plunger.

BRIEF DESCRIPTION OF THE DRAWING

To easily identify the discussion of any particular element or act, the most significant digit or digits in a reference number refer to the figure number in which that element is first introduced. in which.

DETAILED DESCRIPTION

Figure 1A:
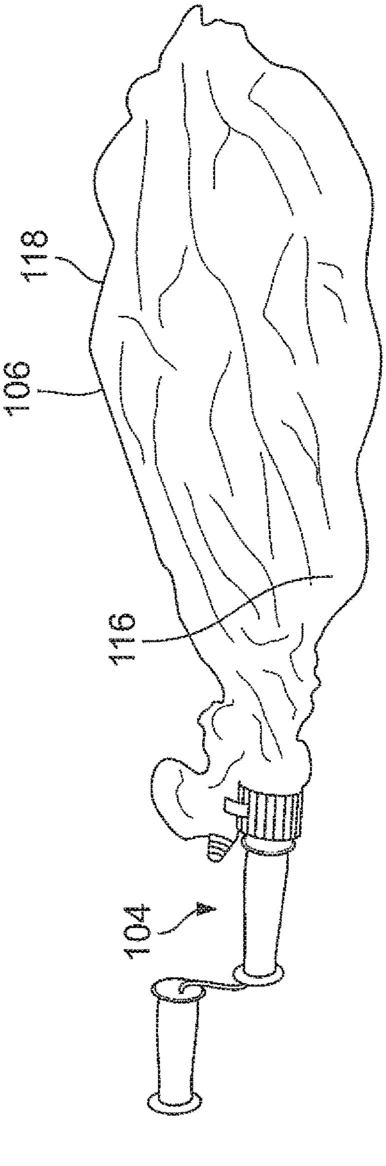
FIG. 1 is a perspective view of a first embodiment of the plumbing tool transporting device as disclosed herein in the closed position with a representative toilet auger positioned in side-by-side relationship.
Figure 1B:
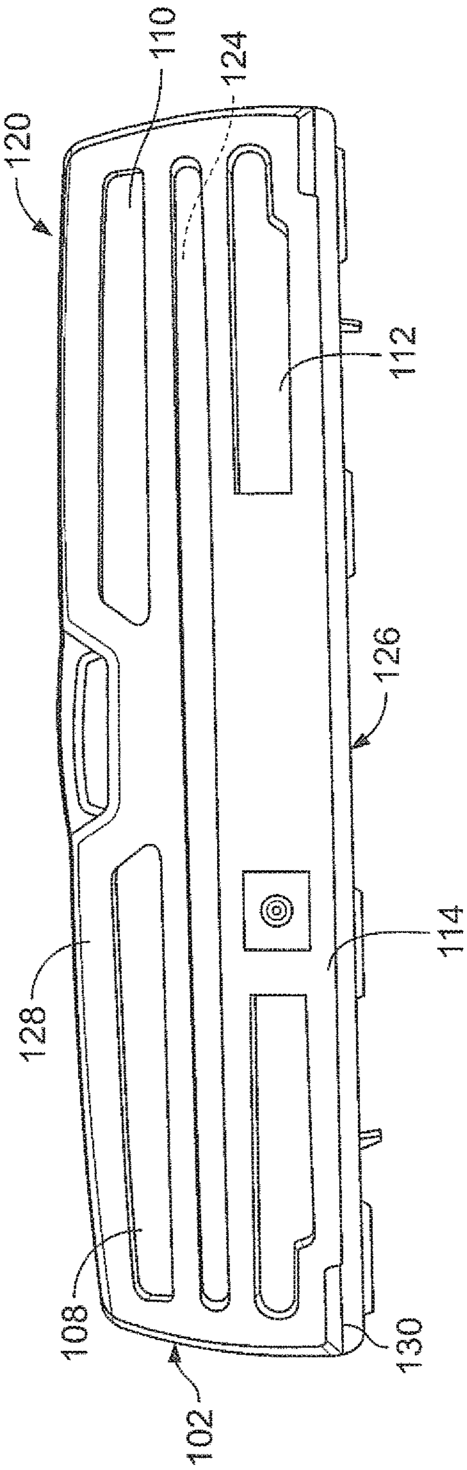

Referring to FIG. 1, a device 102 for transporting a plumbing tool 104 is disclosed. Suitable plumbing tools include devices that become contaminated with biological material and/or fecal solids during use. Such devices pose transport problems as it is undesirable to transport them in a manner that exposes the device to the public and/or provides an opportunity for the device to contaminate various surfaces.

One example of such a plumbing tool 104 is a toilet auger 106. In FIG. 1, the toilet auger 106 is depicted in the manner in which it can be typically transported prior to the development of the device 102, that is the operative contaminated end is wrapped in a plastic garbage bag 118 and removed from the job site such as a public rest room, office building or the like to the plumber's truck or the like. Where possible, the plumbing tool 104 such as the toilet auger 106 may be first removed to a suitable janitors' closet or work room where the plastic wrap such as garbage bag 118 surrounding plumbing tool 104 can be removed that the plumbing tool 104 can be cleaned and sanitized. Where such facilities do not exist, the plumbing tool 104 can remain wrapped and can be placed dirty in the worker's truck to be cleaned off site. It can be appreciated that materials such as garbage bag 118 are prone to leakage and tearing thus increasing the risk of dripping and contamination of the work site, worker's truck or the like. Also, because the job site may not offer the opportunity to clean and sanitize the plumbing tool 104 immediately after the plumbing operation is completed, use of a garbage bag 118 or other plastic wrapping option increases the risk of reuse without sanitizing the plumbing tool 104 between work sites.

The device 102 as disclosed herein provides a mechanism for safely transporting one or more tools such as the plumbing tool 104 in a manner that minimizes the risks for spillage and site contamination can facilitate an effective method for ready cleaning and sanitizing of one or more tools such as plumbing tool 104 that are employed at a job site.

The device 102 for transporting the plumbing tool 104 such as the toilet auger 106 is comprised of an outer housing 108 that includes a first panel member 110 with an outer periphery 112. The first panel member 110 is a rigid elongated panel and can be comprised of a suitable water impervious material such as a plastic or the like. In certain embodiments, the first panel member 110 forms support base 120. Where desired or required, the support base 120 can be composed of multiple layers of rigid polymeric material.

The outer housing 108 defines an interior cavity 124 that has sufficient volume to receive at least one plumbing tool 104 in fixed, spaced relationship therein. In various embodiments, the outer housing 108 can include at least one reclosable aperture that is configured to receive the at least one plumbing tool 104 into the interior cavity 124 and to permit its removal when desired or required. In the embodiment as depicted, the outer housing 108 also includes at least one outer housing side wall 130 that is connected to the first panel member 110 and projects angularly therefrom and terminates in an edge that is positioned in a plane generally parallel and disposed from that defined by the first panel member 110. The edge can be configured to include a suitable seal (not shown).

The device 102 also includes a member 126 that is movably mounted relative to the outer housing 108. The movably mounted member 126 is configured and positioned to permit movement between a first position in which the reclosable aperture is open permitting access into the interior cavity 124 and a second position in which the movable member 126 is in watertight sealed relationship with the outer housing 108. The device 102 can also include suitable attachment mechanisms to facilitate the attachment of the outer housing 108 to the movable member 126. In the embodiment depicted in FIG. 1, one or more hinge members 114 can be disposed along one side of the device to facilitate pivotal movement between the open and the sealed positions. In order to maintain the outer housing 104 and the movable member 126 in a sealed relationship to one another, the device 102 can also include a suitable latch mechanism 128. The latch mechanism 128 can be located at a suitable position on the device 102.

In the embodiment depicted in FIG. 1, the moveable member 126 is configured to be symmetrical to the outer housing 108 with at least one hinge member 114 located along one side to permit the two elements to open and shut in a clamshell-like manner. In the embodiment depicted in FIG. 1, the device 102 also has a handle 116 positioned at a location opposed to the hinge or hinges 114 with the handle 116 and latch mechanism 128 located on the same side.

Figure 2:
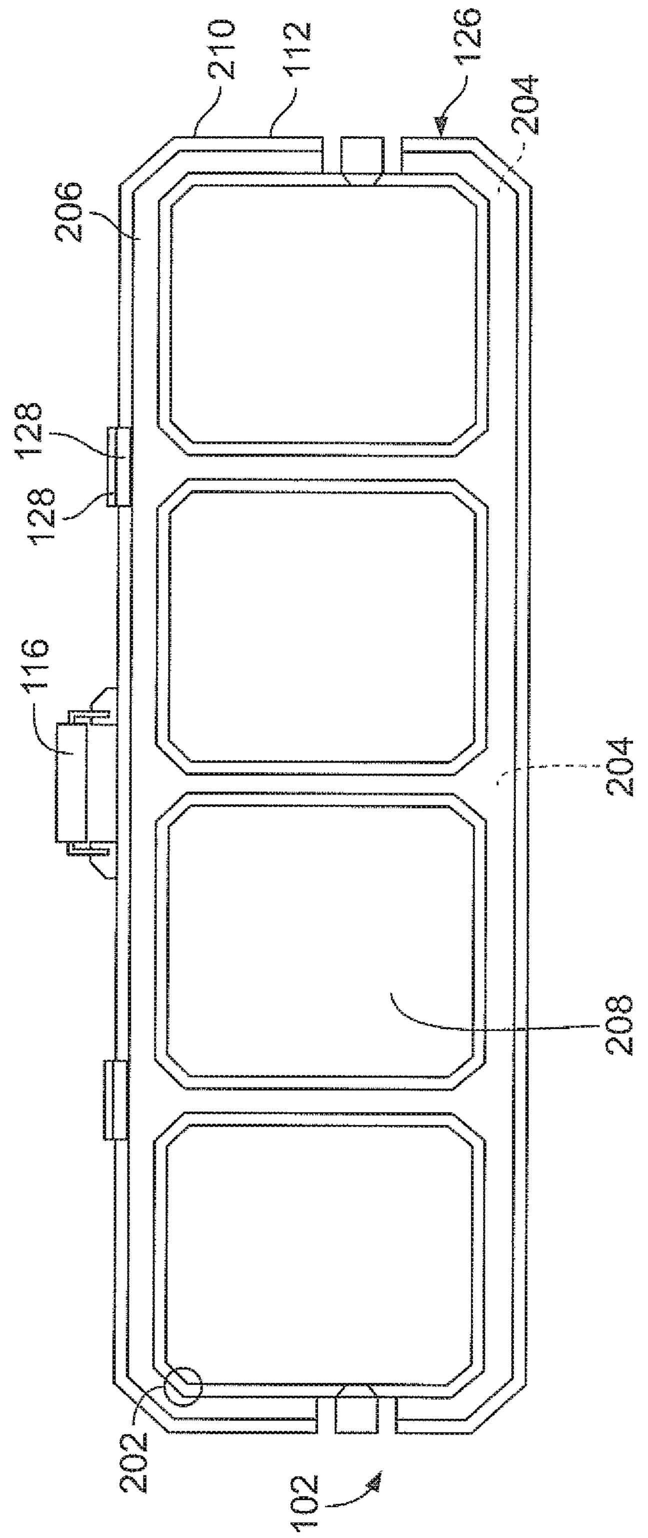
FIG. 2 is a front view of an embodiment of the device depicted in FIG. 1.

FIG. 2 is directed to a front or top view of the device 102 for transporting a plumbing tool 104 such as a toilet auger 106. This view depicts the moveable member 126 which may be an elongated and generally rectangular member that is symmetrical to the outer housing 108. The moveable member 126 can include at least one rigid planar member such a second rigid panel 208 that can include an outer periphery 206. Where desired or required, the moveable member 126 can include suitable reinforcing elements such as reinforcement 204.

In the embodiment illustrated, the moveable member 126 also includes a moveable member side wall 210 that is connected to the second rigid panel 208 and projects angularly therefrom and terminates in an edge that is positioned in a plane generally parallel and disposed from that defined by the second rigid panel 208. The edge can be configured to include a suitable seal (not shown).

Where desired or required, one or both of the outer housing 108 and the moveable member 126 can be configured with a reclosable drain hole such as drain hole 202 depicted in the moveable member 126. The drain hole 202 can be positioned at any suitable location in the device 102. In certain embodiments, the drain hole 202 can be located in the first panel member 110 or a region of the associated element at a location that will facilitated the addition and/or removal of cleaning fluid to and from the device 102.

Figure 8:
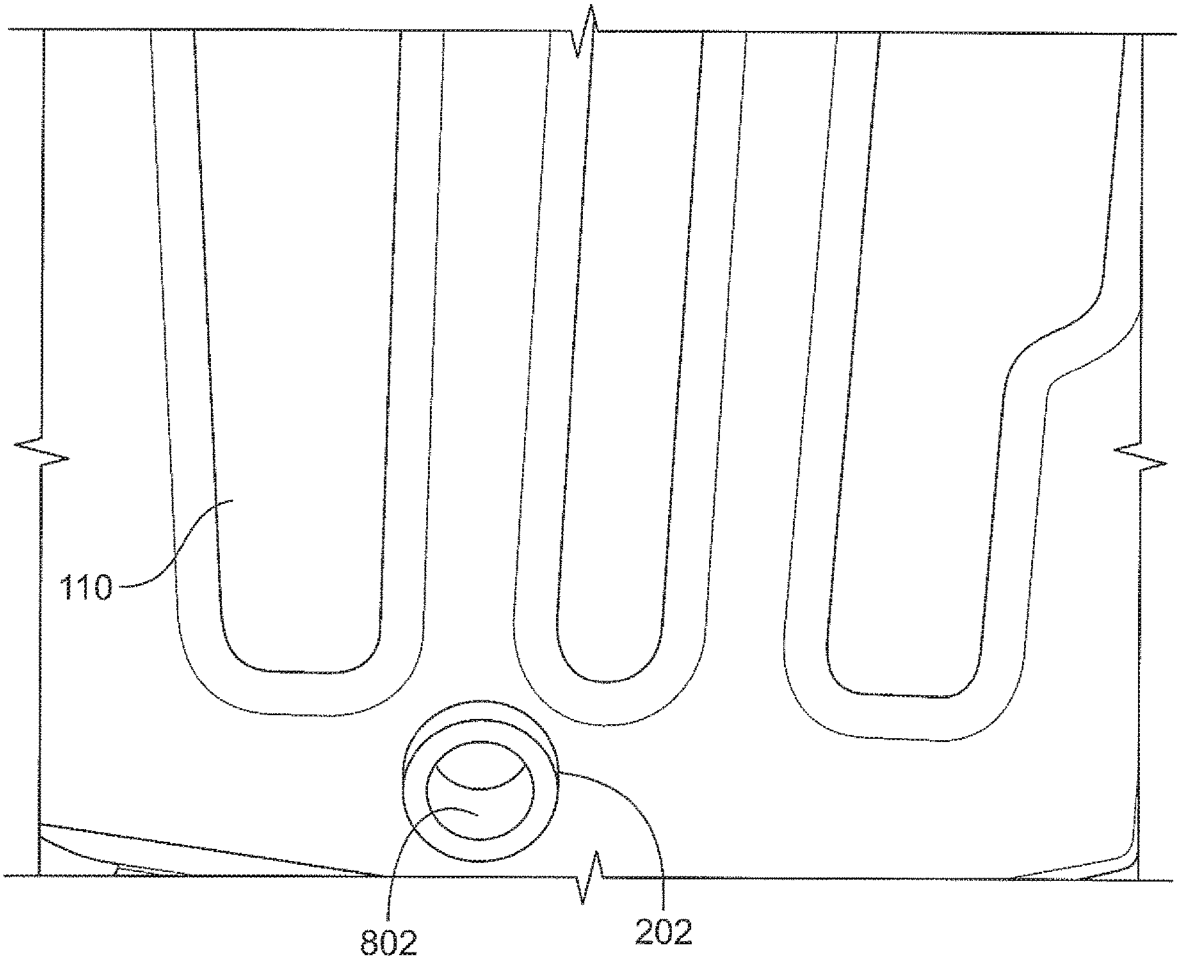
FIG. 8 is a detail of an embodiment of the drain hole 202 as disclosed herein.

The drain hole 202 extends through the associated element to provide access to the interior cavity 124 defined therein. The drain hole 202 can be configured with suitable elements to facilitate engagement with water conduits or the like such as internal threads 702 as depicted in FIG. 8. It is also contemplated that the drain hole 202 can be configured to include a suitable cap (not shown) that sealingly closes the drain hole 202. Engagement between the drain hole 202 and the cap can be accomplished by any suitable mechanism such as threading, snap fitting, and the like.

Figure 3:
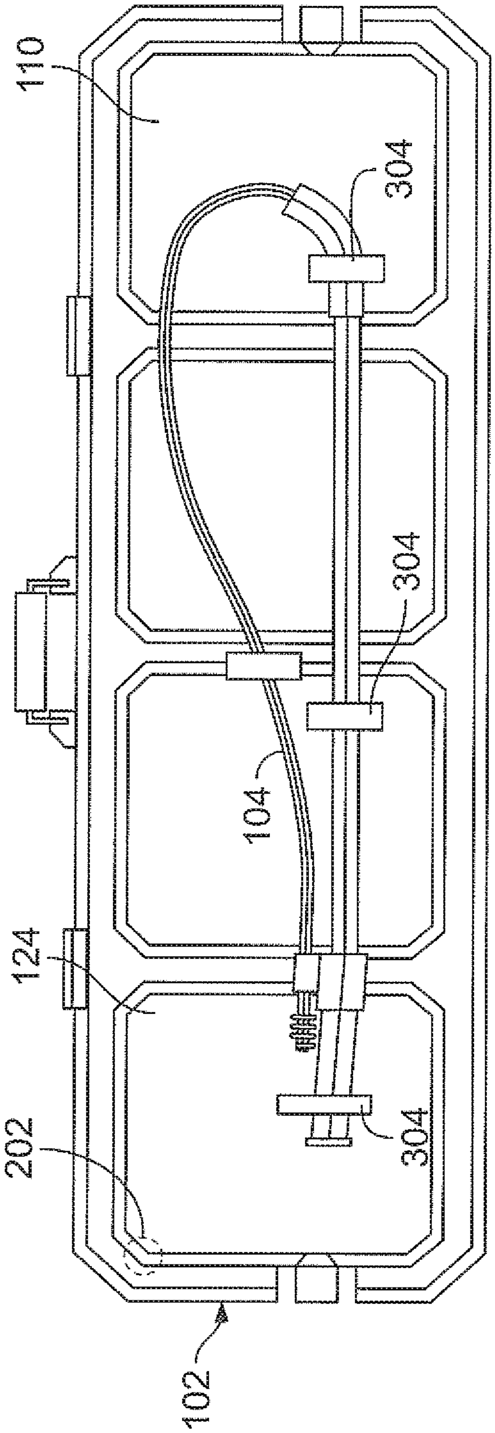
FIG. 3 is a cross sectional view of the device of FIG. 1.
Figure 4A:
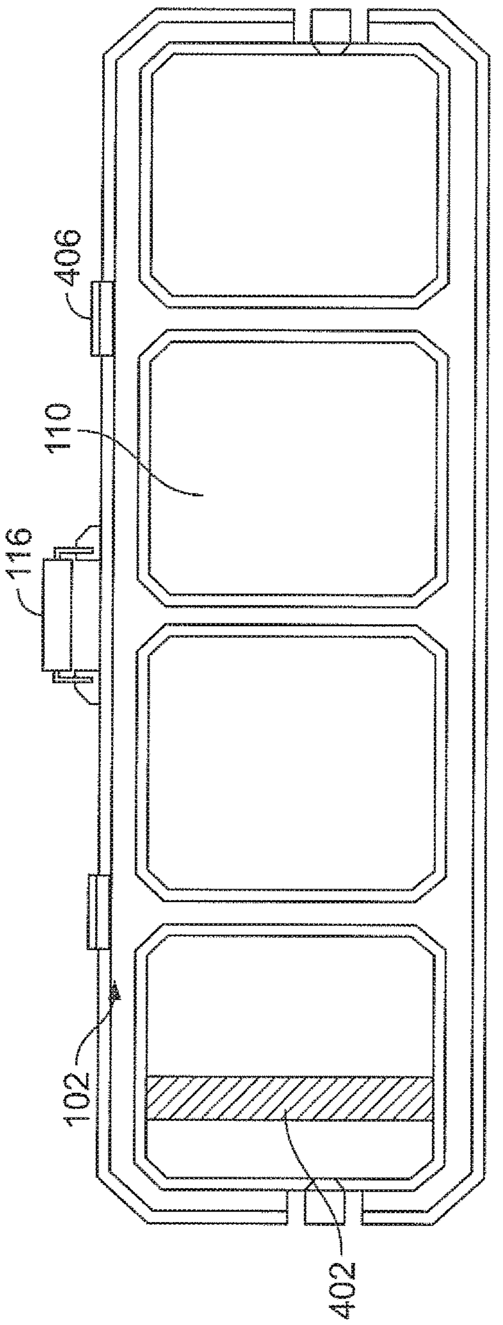
FIG. 4 is a rear view of an embodiment of the device for transporting a plumbing tool as disclosed herein.
Figure 4B:
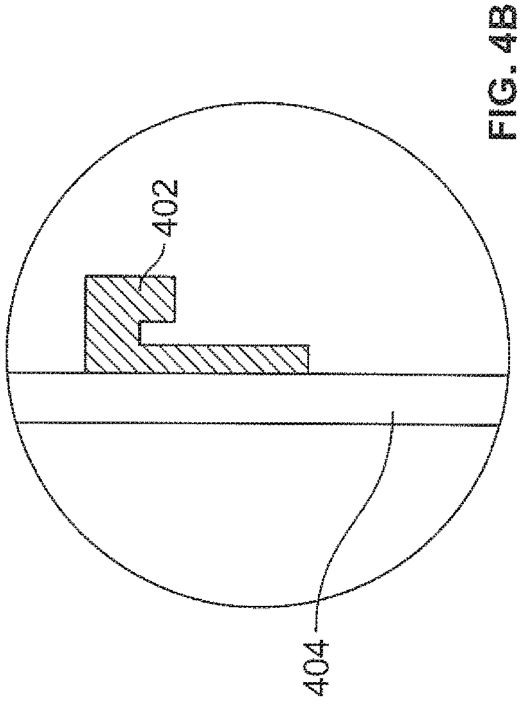
Figure 5:
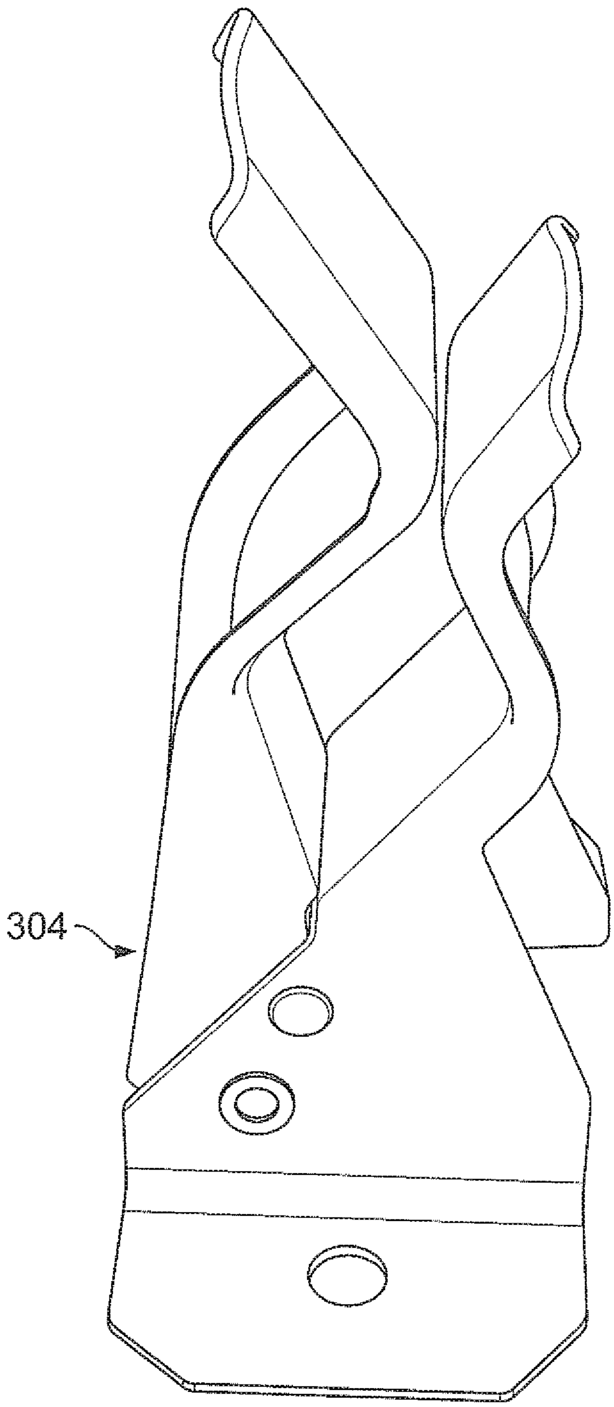
FIG. 5 illustrates an aspect of the subject matter in accordance with one embodiment.
Figure 6:
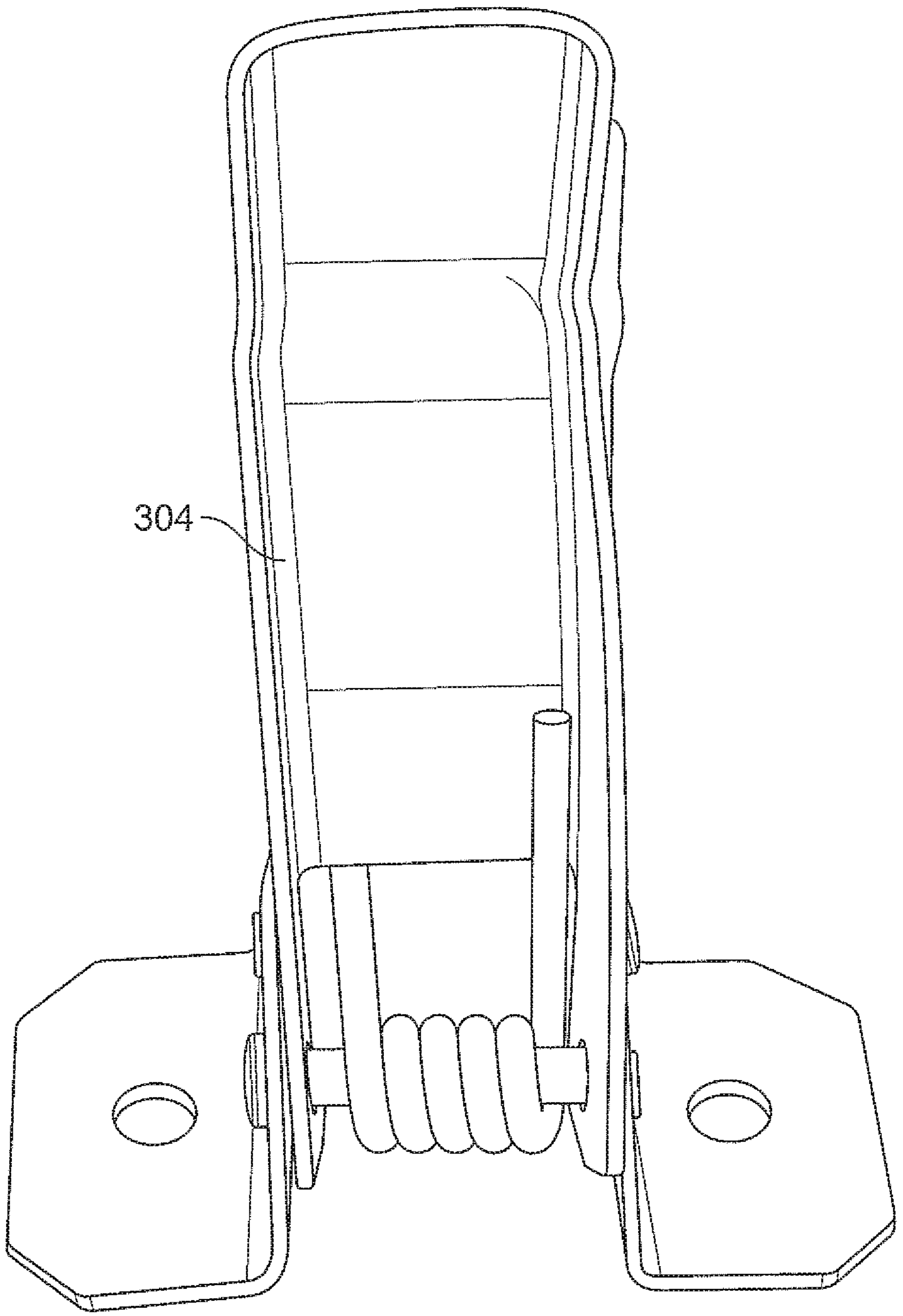
FIG. 6 illustrates an aspect of the subject matter in accordance with one embodiment.

FIG. 3 illustrates a non-limiting example of a plumbing tool 104 such as toilet auger 106 in position in the interior cavity 124 defined in device 102. The interior cavity 124 of outer housing 108 can include at least one first anchor clamp 304 affixed to the interior facing surface of the first panel member 110 to removably receive the plumbing tool 104 in fixed relationship thereto. In certain embodiments, the at least one first anchor clamp 304 can project into the interior cavity to position the plumbing tool 104 in a spaced distance for the interior surfaces of the moveable member 126 and the outer housing 108. Where desired or required, the at least one first anchor clamp 304 can be a suitable spring-loaded clamp, a non-limiting example of such is illustrated in FIG. 5 and FIG. 6.

The number of first anchor clamp 304 that are located in the interior cavity 124 will be that necessary to hold the plumbing tool 104 in position relative to the interior cavity 124. In certain embodiments this number will be between two and seven.

Each first anchor clamp 304 will be positioned such that the plumbing tool 104 is located at a spaced distance from the drain hole 202 when in the fixed position in the interior cavity 124. Without being bound to any theory, it is believed that that the spaced distance between the drain hole 202 and plumbing tool 104 facilitates agitation and turbulence when cleaning liquid is introduced through the drain hole 202 to provide enhanced cleaning action during the initial introduction cleaning liquid phases. This induced turbulence is particularly evident when the cleaning fluid is introduced into the device in the sealed condition.

Once the desired amount of cleaning liquid is introduced into the device, the drain hole 202 can be closed and the device transported. In many applications, the volume of cleaning liquid introduced will be less than the volume of the interior cavity. The action of transporting the device 102 from the work site can create further agitation that can serve to loosen any material adhering to the plumbing tool 104. Once the device 102 is transported to a suitable site, the drain hole 202 can be opened and the cleaning liquid can be disposed of in an environmentally suitable manner.

The cleaning liquid employed can be an aqueous material that can include suitable amounts of one or more surfactants, sequestrants antibacterial materials, antimicrobials and the like as desired or required.

While introduction of the cleaning fluid has been discussed with regard to the drain hole 202, it is within the purview of this disclosure to introduce cleaning fluid into the interior chamber prior to closing the device if desired.

Where desired, the device 102 can be configured with a hanger or other suitable mounting member to permit the device to be mounted to a wall or other upright member for storage and the like. One non-limiting example of such a mounting device is a lateral bracket 402 attached to the outer surface 402.

A suitable embodiment of a first anchor clamp 304 is illustrated in FIG. 6 and FIG. 5.

Figure 7:
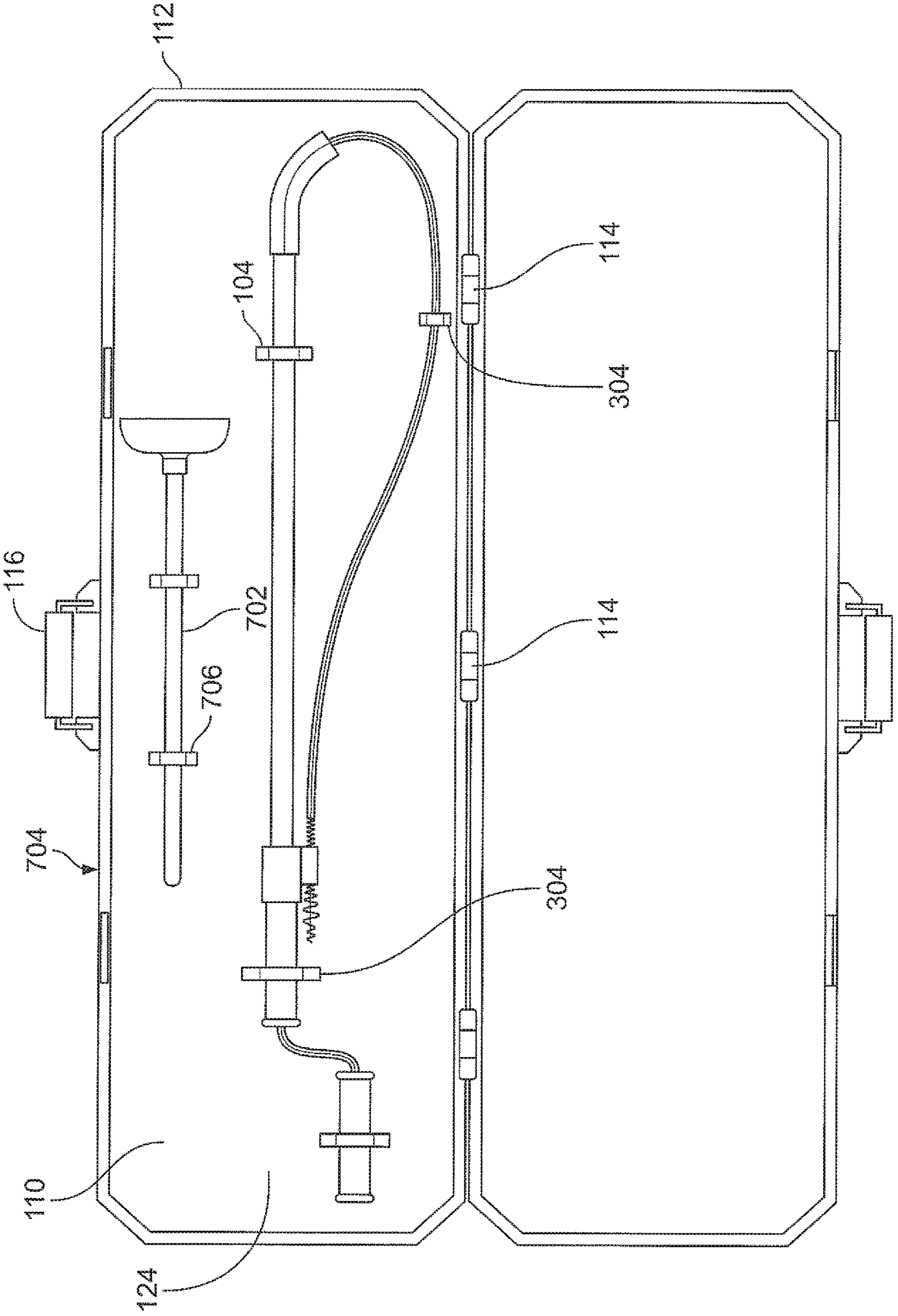
FIG. 7 is a plan view of a second embodiment of the device for transporting at least one plumbing tool as disclosed herein.

An alternate embodiment for transporting multiple plumbing tools of similar or different configurations is illustrated in FIG. 7. In certain embodiments, the device can be configured to accommodate more than one plumbing tool 104. It is contemplated that the device 704 can be configured to accommodate two plumbing devices that would require cleaning and sanitizing such as a toilet auger 106 and a plunger 702. in such embodiments, the device 102 will include at least one second anchor clamp member 706 configured to secure the plunger 702 in a manner that facilitates cleaning. The device 704 will include at least one drain hole 202 at a suitable location and can be employed in the manner described previously.

Figure 9:
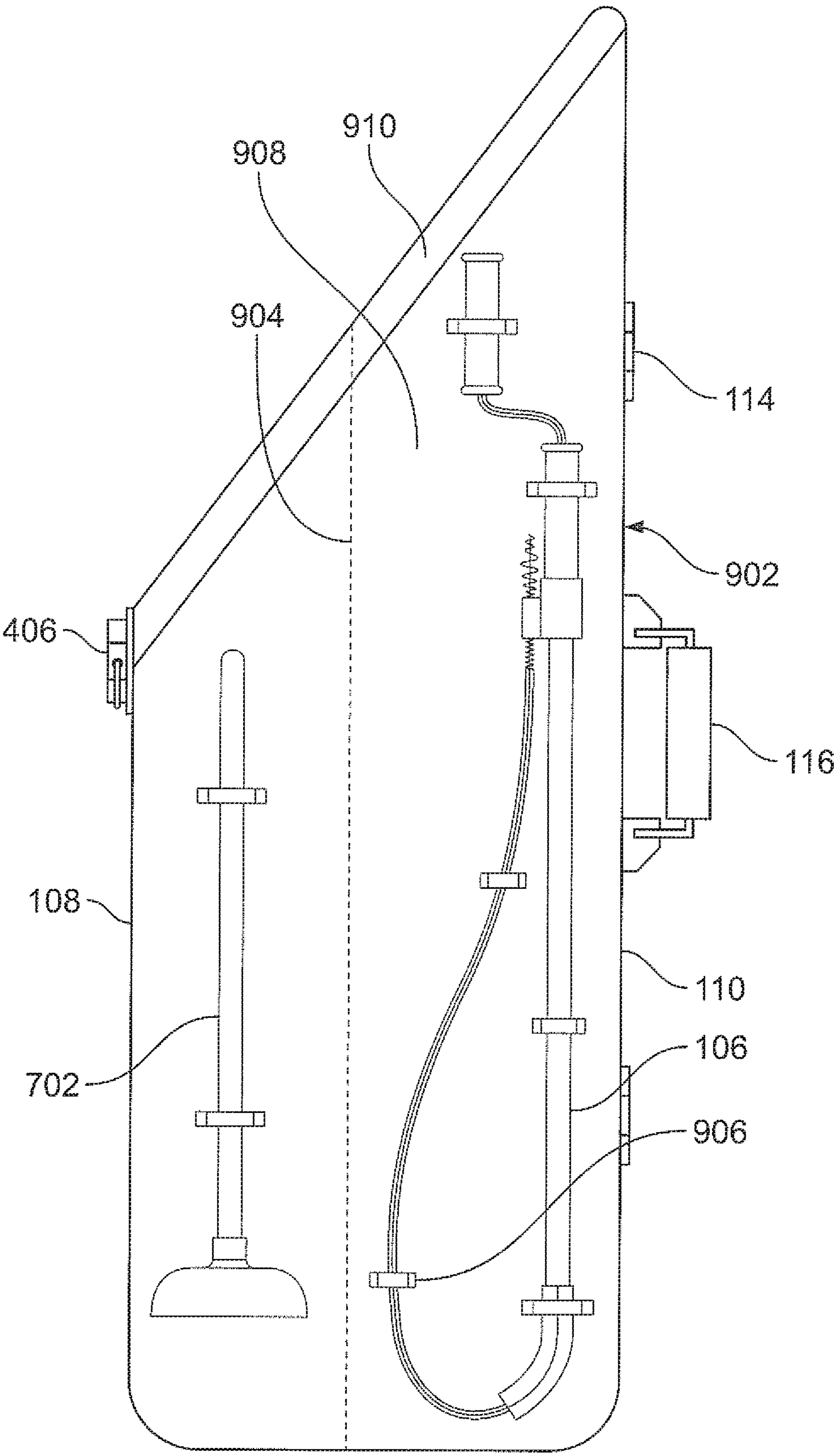
FIG. 9 is an alternate embodiment of the device as disclosed herein.
Figure 10:
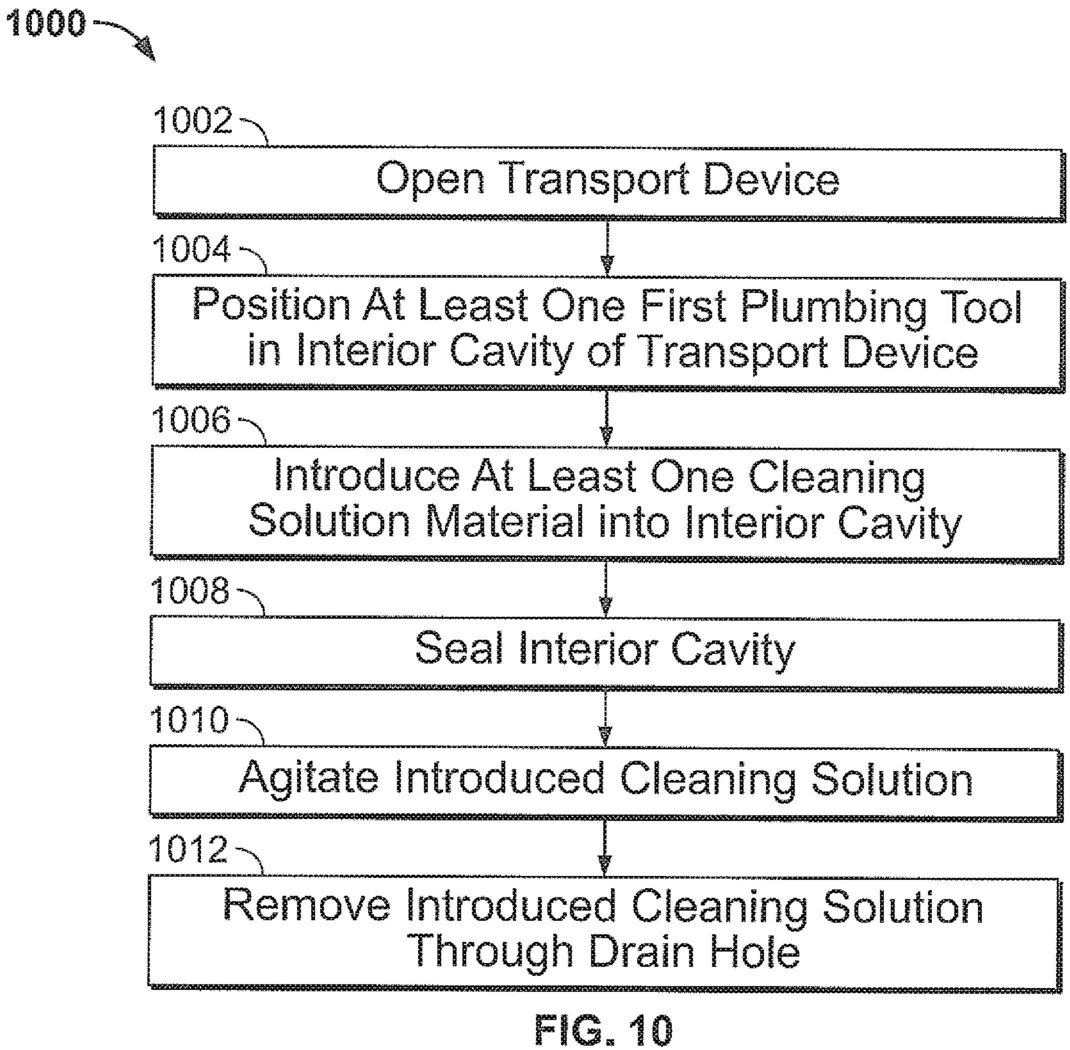
FIG. 10 is a process diagram of an embodiment of the cleaning method as disclosed herein.
Figure 11A:
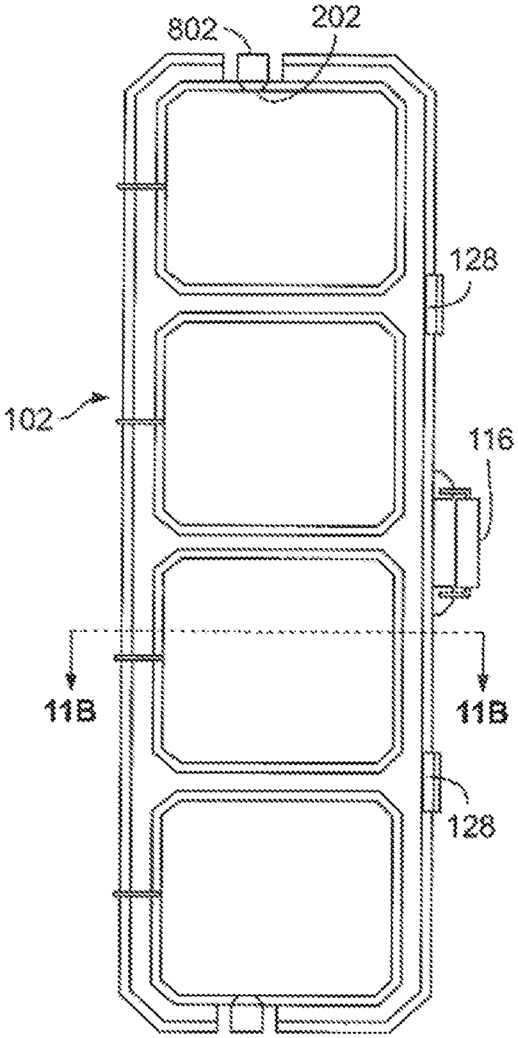
FIG. 11 is directed to various details of the embodiment of FIG. 1.
Figure 11B:
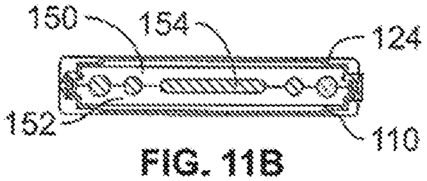

FIG. 9 is directed to an alternate configuration of the device 902 for transporting at least one plumbing tool 104. In the embodiment as depicted, the plumbing tools included are a toilet auger 106 and a plunger 702. Where desired or required, the device 902 can be employed to transport multiple toilet augers or the like.

The device 902 includes an outer housing 108, a first panel member 110, a hinge member 114, a handle 116, a latch 406, a plunger 702, a moveable member 910, a divider wall 904, a support base 906, and a reclosable access aperture 908.

As outlined in the process diagram 1000, the method for cleaning at least one plumbing tool such as plumbing tool 104 includes the step of opening a transport device such as device 102, device 702 or device 902 as depicted at block 1002. At least one first plumbing tool such as plumbing tool 104 is positioned in the interior cavity such as interior cavity 124 as at block 1004. This can be accomplished by engaging the plumbing tool 104 with at least one first anchor clamp 304. A cleaning solution is introduced into the interior cavity at block 1006. The interior cavity 124 can be sealed at block 1008. Cleaning solution can be introduced prior to or after the interior cavity 124 is sealed.

Once the cleaning solution is introduced into the sealed interior cavity 124, the solution can dwell in the cavity for an interval of at least 1 minute with an interval between 1 and 10 minutes being employed in certain situations. The interval can occur with agitation as at block 1010. Once the interval has expired and/or the device 102 is in a suitable location, the cleaning solution can be removed through the reclosable access aperture 908 at block 1012.

Figure 12:
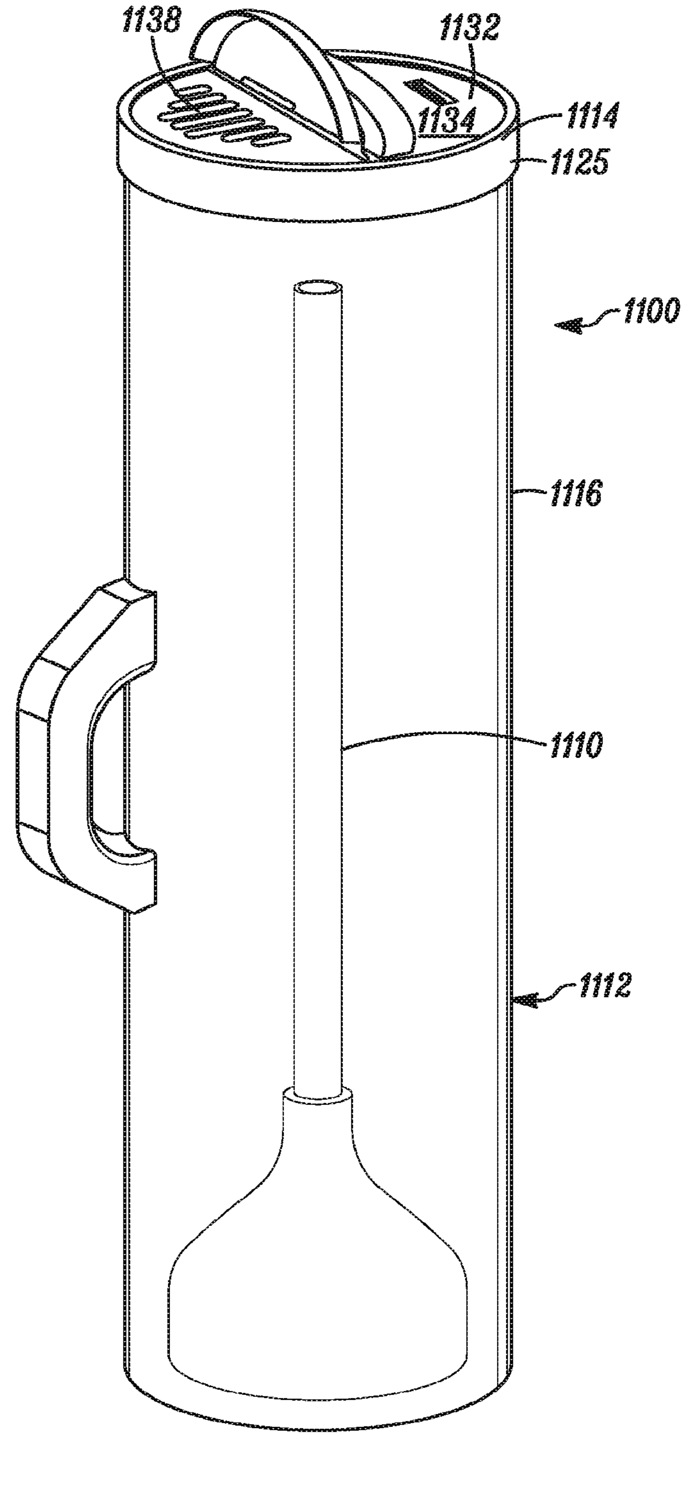
FIG. 12 is a perspective view of a third embodiment of the plumbing tool transport device.
Figure 13:
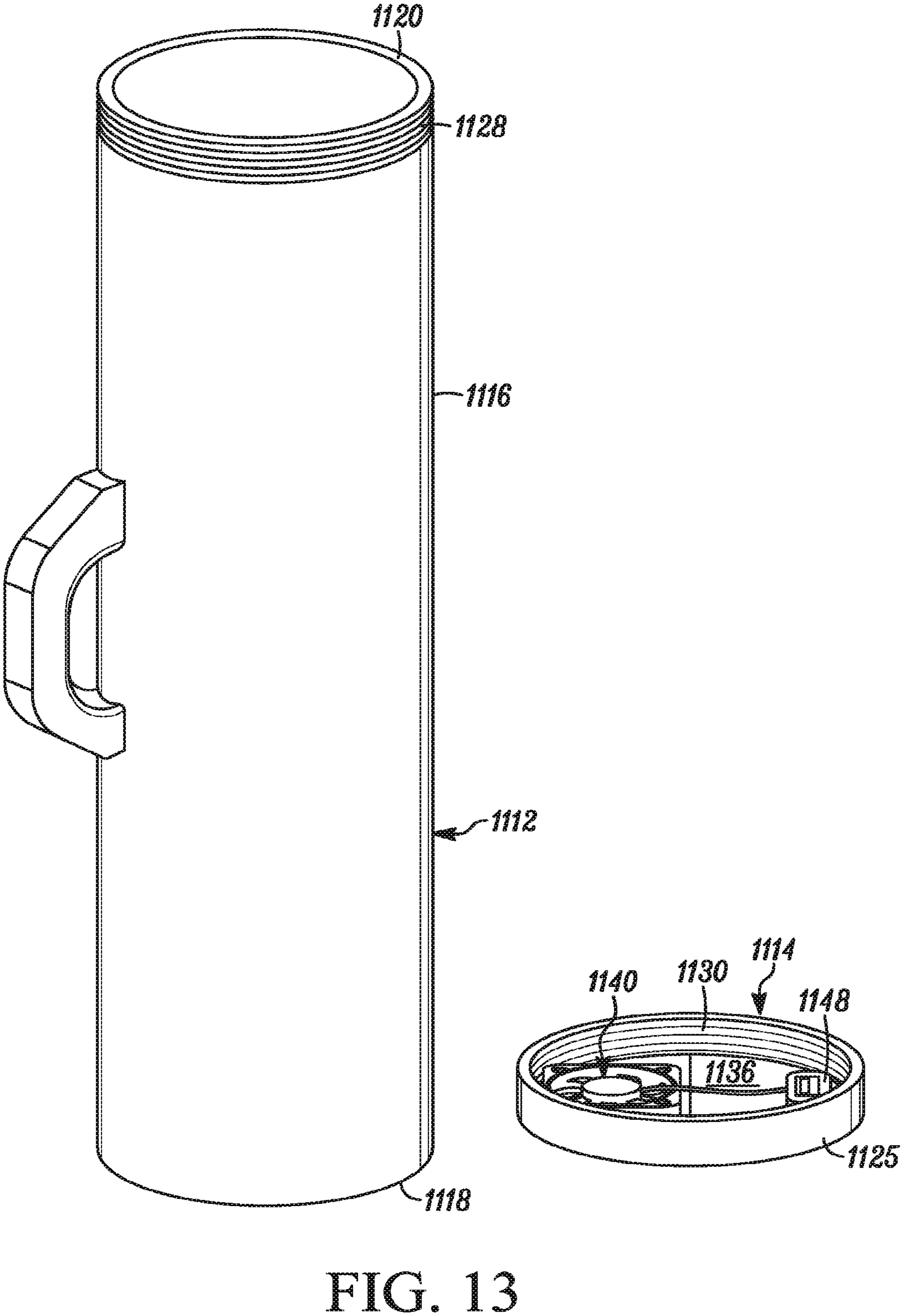
FIG. 13 is a perspective view of the third embodiment of plumbing tool transport device of FIG. 12 in the open position.
Figure 14:
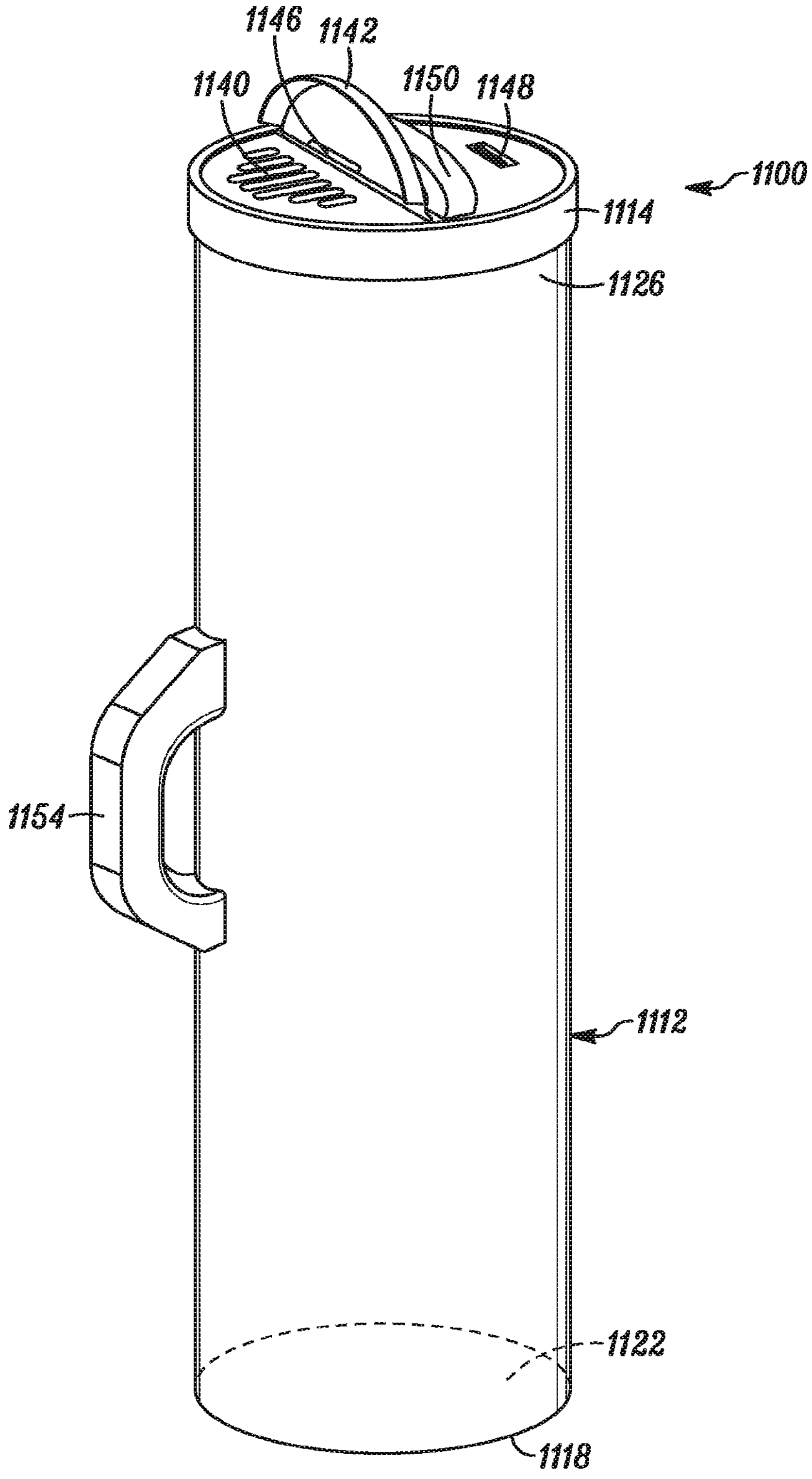
FIG. 14 is a perspective view of the third embodiment of plumbing tool transport device of FIG. 13 with a plunger shown in phantom.

Turning now to the embodiment depicted in FIGS. 12, 13 and 14, the embodiment of the device 1100 for transporting a plumbing tool 104 such as a plunger 1110 includes a housing 1112 that defines an inner cavity into which the plunger 1110 can be telescopically inserted and removed and a removable lid 1114 configured to releasably connect to the housing 1112 to enclose the inner cavity.

The housing 1112 can be an elongate member. In the embodiment as illustrated in FIGS. 12, 13, and 14 the housing 1112 is configured as a cylindrical member that includes a cylindrical wall member 1116 having a first end 1118 and a second end 1120 opposed to the first end 1118. The housing 1112 also includes a base wall 1122 that is connected to the second end 1120 of the cylindrical wall member 1116.

The removable lid 1114 can have any suitable configuration that accomplishes releasable fluid tight engagement. In the embodiment depicted in FIGS. 12, 13, and 14, the lid 1114 includes a cylindrical body 1125 that is configured to engage the exterior surface 1126 of the cylindrical wall member 1116 proximate to the first end 1118 by any suitable mechanism. In the embodiment illustrated in the FIG. 13, the region of the cylindrical wall member 1116 proximate to the first end 1118 can be configured with an exteriorly oriented threaded surface 1128 that can threading engage a mating threaded surface 1130 that is defined on an interior surface of the cylindrical body 1125 of the removable lid 1114.

In certain embodiments, the removable lid 1114 can be configured to maintain fluid-tight engagement between the removable lid 1114 and the housing 1112. Where desired or required, the removable lid 1114 can have a suitable seal or seals (not shown) positioned to be interposed between the lid 1114 and the first end 1118 of the cylindrical wall member 1116 to provide a fluid tight seal and enclose the interior cavity that is defined in the housing 1112.

The removable lid 1114 includes a planar member 1132 having a first face 1134 that is outwardly oriented when the removable lid 1114 is in engagement with the housing 1112. The planar member 1132 also includes a second face 1136 that is opposed to the first face 1134 and is inwardly oriented when the removable lid 1114 is in engagement with the housing 1112.

Figure 15:
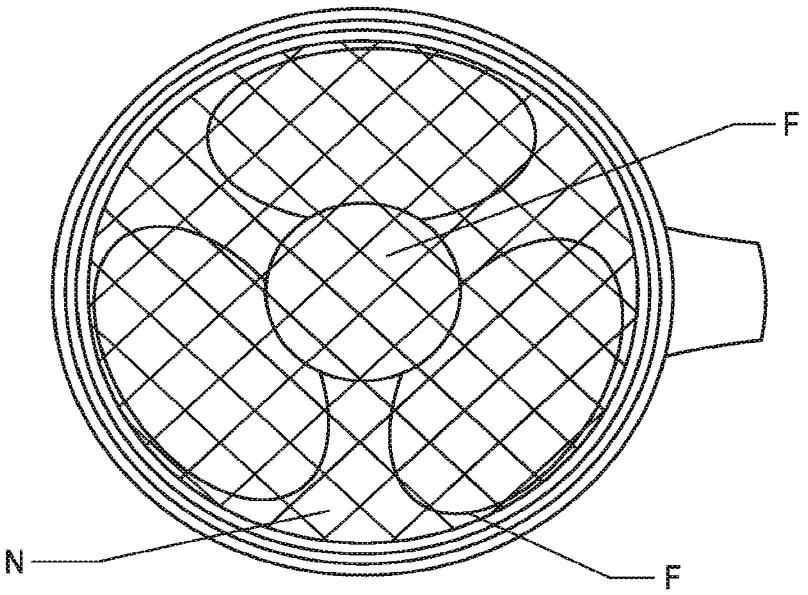
FIG. 15 is a detail plan view of an embodiment the fan member located in the embodiment depicted in FIG. 13.

The device 1100 also includes a fan member 1140 that is operatively mounted to the removable lid 1114. In the embodiment illustrated in FIG. 13, the fan member 1140 is mounted in an offset relationship to the center of the removable lid 1114. It is also within the purview of the present disclosure that the fan member 1140 be centrally mounted as depicted in FIG. 15.

The fan member 1140 can be configured with a suitable control member such as switches and the like. In certain embodiments, the control member can be a switch located on the removable lid 1114 such as on the planar member 1132.

In the embodiment depicted in FIGS. 12, 13, and 14, the planar member 1132 can include at least one aperture 1138 that extends from the first face 1134 to the second face 1136. The at least one aperture 1138 is located in the removable lid 1114 at a location proximate to the location of the fan member 1140. One non-limiting aperture configuration is depicted in FIG. 12. The at least one aperture 1138 can be configured as at least two parallel apertures. Other aperture configurations are also considered within the purview of this disclosure.

Where desired or required, the removable lid 1114 can also include an aperture closure mechanism configured to cover and uncover the at least one aperture 1138 when required. It is contemplated that the aperture closure mechanism can be maintained in the closed position as during storage and/or transport and be opened during fan operations to ventilate and/or facilities drying of the plunger 1110 contained within the interior cavity defined in the housing 112.

In the embodiment depicted in FIG. 12, the closure mechanism is a semi-circular flap member 1142. Where desired or required, the semi-circular flap member 1142 can be configured with a suitable snap closure to maintain the semi-circular flap member 1142 in a closed position. Where desired or required, the close position can be watertight.

In the embodiment depicted in FIG. 12, the movement of the flap member 1142 between the closed and opened position can be accomplished by any suitable mechanism such as pivot 1146 defined in planar surface 1134.

The fan member 1140 can be powered by any suitable means such as by an on-board battery or the like. In certain embodiments, the fan member 1140 can be powered by being plug-in to a suitable external power source. In the embodiment in FIG. 12, the removable lid 1114 includes a USB power port 1148 defined in the planar surface 1134. The USB power port can be in electric communication with the fan member 1140.

Where desired or required, the removable lid 1114 can also include suitable sensors, controllers and the like that are operatively connected to the fan member 1140 and can be suitably mounted.

The removable lid 1114 can also include a suitable handle member 1150. The handle member 1150 can project outward from the planar surface 1134 to provide a suitable hand grip that can facilitate carrying and/or tightening and loosening of the removable lid 1114.

Figure 16:
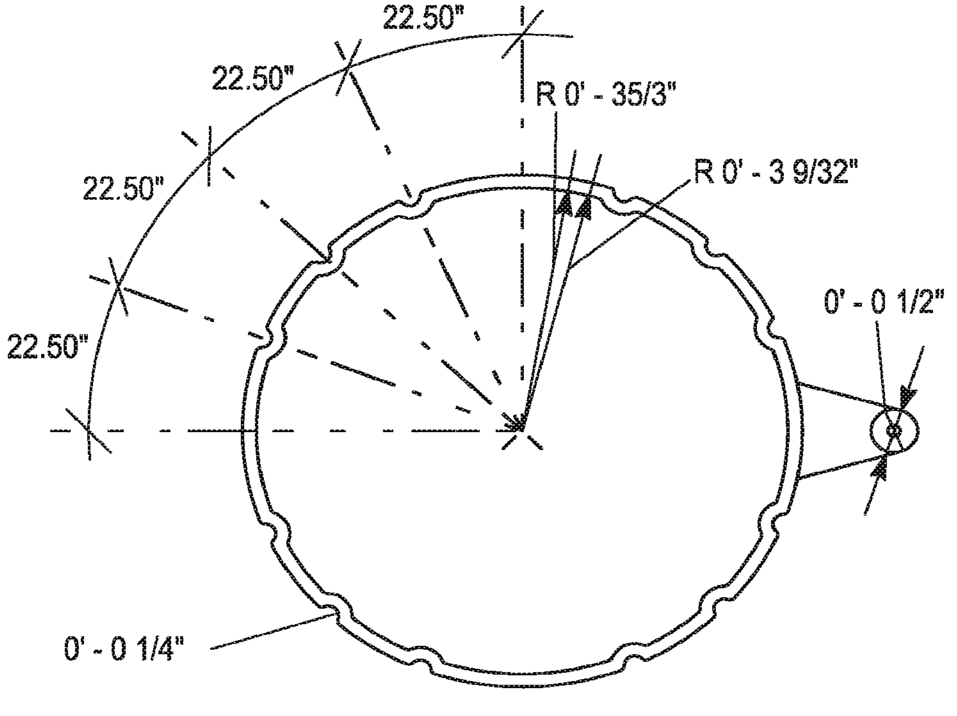
FIG. 16 is detail cross section of an embodiment of the cylindrical wall of FIG. 12.

The cylindrical wall member 1116 can have a suitable surface configuration. Two non-limiting surface configurations are smooth as depicted in FIGS. 12, 13 and 14 and a corrugated surface as depicted in FIG. 16. In the embodiment depicted in FIG. 16, the cylindrical wall member 1116 can include a plurality of longitudinally oriented corrugations that are axially disposed on the cylindrical wall member 1116.

The device 1100 can also be equipped with a suitable carrying handle such as carrying handle 1154. Where desired or required, at least one carrying handle 1154 can be connected to the exterior surface of the cylindrical wall member 1116. In certain embodiments, the housing 1112, handle 1154 and removable lid 1114 can be formed of a suitable water-proof material. Non-limiting examples of water-proof materials include moldable polymeric compounds.

The device 1100 can be dimensioned to removably receive a plunger. In certain embodiments, the device can have a diameter sufficient to accommodate the suction sup part of the plunger 1110 in a stable orientation within the housing 1112. In certain embodiments, the diameter can be between four and eight inches, with an inner diameter between approximately five and six inches being employed in certain embodiments.

The height of the housing 1112 can be that sufficient to contain the plunger 1110 therein. In some embodiments, the height as measured from lid to base will be between 12 inches and 36 inches, with heights between 18 and 30 inches being employed in some embodiments. The thickness of the wall such as cylindrical wall 1116 of the housing 1112 will be that sufficient to provide and maintain the structural integrity of the device 1110. In certain embodiments, the wall thickness will be between 0.1 and 0.75 inches, with a thickness between 0.2 and 0.3 being employed in certain embodiments.

Figure 17:
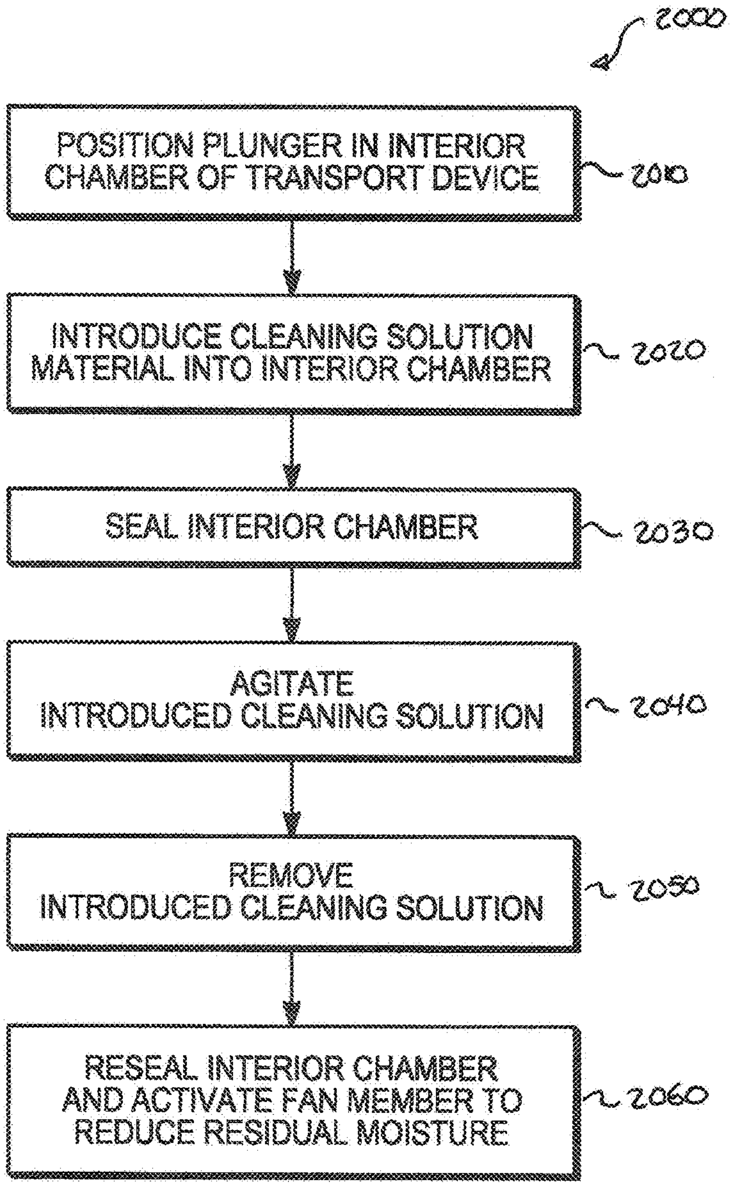
FIG. 17 is a process diagram of an embodiment of a cleaning method as disclosed herein employing the plumbing tool transport device of FIG. 12.

As outlined in the process diagram 2000 as depicted in FIG. 17, the method for transporting and cleaning a plunger such as plunger 1110 includes the step of positioning a plunger in a device having an outer housing defining an interior chamber, a lid that can sealingly cover an opening communicating with the interior chamber defined in the housing and a fan member operatively mounted in the lid as at reference step 2010. Once the plunger 1110 is introduced into the interior chamber defined in the housing, the method includes the step of introducing cleaning solution material into the interior chamber as at reference numeral 2020. In certain embodiments, the cleaning solution material can be introduced into the interior chamber defined in the housing thought the opening defined housing. The amount of cleaning solution material that is added can be that sufficient to remove contaminants form contact with the associated plunger 1110. This amount will typically be a volume less than the volume of the interior chamber. The cleaning solution can be a suitable composition that can accomplish cleaning an/or sanitizing. The cleaning solution material can be aqueous, organic or a mixture of the aqueous and organic. In certain embodiments, the cleaning solution material can include one or more lower vapor pressure materials that are compatible with the material employed in the plunger.

Once the cleaning solution is introduced into the interior chamber, the interior chamber can be sealed as at reference numeral 2030. In certain embodiments, sealing can be accomplished by affixing the removable lid in overlying sealed relationship to the opening communicating with the interior chamber. The introduced cleaning solution can be agitated as at reference number 2040. Agitation can occur for an interval sufficient to clean and/or sanitize the plunger surface(s). In certain embodiments, the solution can remain in the interior chamber for an interval of at least 1 minute, with an interval between 1 and 10 minutes being employed in certain situations. Once the contact interval has expired and/or the device is in a suitable location, the cleaning solution can be removed as at reference numeral 2050. In the embodiment illustrate, removal van be accomplished through the opening communicating with the interior chamber by temporarily removing the lid Once the majority of the cleaning solution material has been removed, the interior chamber has with the plunger present therein can be resealed and the fan activated to reduce residual moisture as at reference numeral 2060. It is also considered with in the purview of this disclosure to perform similar operation on an empty device if desired or required.

Once the moisture removal/reduction operations have been completed, fan operations can be discontinued, and the device can be employed to transport the plunger in a clean and discrete manner.

The device 1100 and method 2000 as disclosed herein can also be employed without the use of cleaning solution material in certain situations. Thus, it is possible to engage the fan for specified intervals to reduce moisture in the interior chamber during storage and/or transport.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device for transporting a plunger comprising:

an outer housing defining an interior cavity removably receiving a plunger, the outer housing including:

a cylindrical wall member having a first end and a second end opposite the first end, and a circular base wall in contiguous contact with the second end of the cylindrical wall member;

a circular lid configured to releasably and sealingly engage the first end of the cylindrical wall member, the circular lid including a planar inner surface and a planar outer surface disposed parallel to the planar inner surface, the planar outer surface defined by a profile and a side wall projecting away from the profile of the planar surface in an orthogonal direction wherein the lid is configured to sealingly and releasably connect to the first end of the elongated housing such that the side wall of the lid overlaps the side wall of the elongated housing, the planar outer surface having a series of elongated apertures extending through the planar outer surface to the planar inner surface of the lid, wherein the planar outer surface and the planar inner surface are parallel to the base wall when the circular lid is in engagement with the outer housing, wherein the circular lid has a midpoint;

a flap pivotably connected to the planar outer surface of the lid, the flap moveable between an open position and a watertight closed position, wherein the flap covers the series of elongated aperture defined in the circular lid when the flap is in the closed position, wherein the flap is configured with a snap closure to maintain the flap in the closed position; and a fan operatively mounted to the lid at a position offset from the circular midpoint of the lid and adjacent to the series of elongated apertures defined in the planar outer surface, wherein the fan position parallel to the base of the outer housing when the lid engaged with the outer housing and is configured to circulate air throughout the interior cavity of the elongated housing when the lid is connected to the elongated housing.

2. The device of claim 1, further comprising:

a universal serial bus (USB) port positioned on the lid configured to provide electrical communication to the fan when connected to an external power source.

3. The device of claim 1, wherein the outer housing further includes a handle extending outwardly from the cylindrical wall member.

4. The device of claim 1, further comprising:

a plunger positioned within the interior cavity of the outer housing, where the plunger includes a plunger cup and a plunger handle connected to the plunger cup, the plunger cup located proximate to the circular base of the outer housing and the plunger handle projecting from the plunger cup coaxial to the cylindrical outer wall.

5. The device of claim 4, wherein the outer housing is configured to releasably engage the plunger and maintain the plunger in a fixed relationship relative to the outer housing.

6. The device of claim 1, further comprising means for powering the fan, the means for powering the fan connected to the planar inner surface at a second region of the lid.

7. The device of claim 1, wherein the at least one flap includes a geometry that is defined by a semicircular profile.

8. The device of claim 7, wherein the at least one flap is pivotably mounted to the planar outer surface of the lid via a hinge.

9. The device of claim 1, wherein the circular lid is configured to threadedly engage the first end of the cylindrical wall member.

10. The device of claim 1, further comprising:

an electrical plug positioned on the planar outer surface of the lid and electrically connected to the fan.

11. The device of claim 10, wherein the electrical plug is a universal serial bus (USB) port.

12. A device configured to transport a plunger, the plunger having a plunger cup and a plunger handle, the device comprising:

an outer housing defining an interior cavity, the outer housing including:

a cylindrical wall member having a first end and a second end opposed to the first end, and a base wall in contiguous contact with the second end of the cylindrical wall member, wherein the interior cavity receives the plunger cup and a plunger handle and and wherein the plunger cup contacts the base wall when the plunger is in a transport position;

a circular lid configured to releasably and sealingly engage the first end of the cylindrical wall member, the circular lid including:

a planar outer surface, a planar inner surface opposed to the planar outer surface, and a series of elongated apertures defined in the planar outer surface extending to the planar inner surface located on a first region of the lid, wherein the circular lid has a center point;

a fan operatively mounted to the circular lid at a position offset from the center point of the circular lid and adjacent to the series of elongated apertures of the circular lid, wherein the fan is configured to introduce and circulate air into the interior cavity when the circular lid is engaged with the cylindrical wall member, wherein the fan covers an area of the circular lid that is defined by the series of elongated apertures defined in the lid; and at least one flap movably mounted on the planar outer surface of the lid, the at least one flap movable between an open position and a closed position, wherein the at least one flap covers the series of elongated apertures defined in the lid when the at least one flap is in the closed position.

13. The device of claim 12, wherein the circular lid further comprises a flap pivotably connected to the planar outer surface of the lid, the flap moveable between an open position and a watertight closed position, wherein the flap covers the series of elongated aperture defined in the circular lid when the flap is in the closed position.

14. The device of claim 13, further comprising:

a universal serial bus (USB) port positioned on the lid configured to provide electrical communication to the fan when connected to an external power source.

15. The device of claim 14, wherein the lid further comprises a handle projecting outward from the planar outer surface.

* * * * *